Feb. 23, 1937. J. R. WINTER Re. 20,278

GREASE SEAL

Original Filed Jan. 7, 1932

INVENTOR
John R. Winter
BY
Harness Dickey Pierce Hamm
ATTORNEYS.

Reissued Feb. 23, 1937

Re. 20,278

UNITED STATES PATENT OFFICE 20,278

GREASE SEAL

John R. Winter, Detroit, Mich.

Original No. 1,961,438, dated June 5, 1934, Serial No. 585,300, January 7, 1932. Application for reissue July 23, 1934, Serial No. 736,616

10 Claims. (Cl. 288—1)

The invention relates to grease or lubricant seals and the principal objects thereof are to provide a seal simple and inexpensive in construction, and efficient in operation to prevent the escape of grease or other lubricant along a rotating shaft; to provide a seal for this purpose which has a more positive automatic takeup to insure attaining a seal around the shaft at all times; to provide a seal of the above designated character in which a split sealing ring may be employed, thereby permitting manufacture of the ring from elongated pieces of sealing material, and avoiding stamping of a ring from a sheet of such material with accompanying waste; to provide a seal which insures automatic pressing of the sealing ring against the rotating shaft constantly; and to provide a seal which will retain its efficiency under conditions where the shaft and seal support are not in true concentricity in the region of the seal.

Other objects of the invention will be apparent from the following description and drawing, of particular embodiments of the invention, as well as from the claims hereinafter set forth.

For a better understanding of the invention reference may be had to the accompanying drawing forming a part of the specification, wherein.

Figure 7:
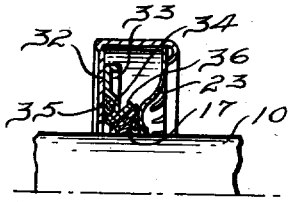
Figure 7 is a fragmentary cross-sectional view of a seal constructed according to another form of the invention.
Figure 9:
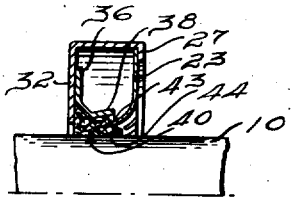

Figure 9 also is a view similar to Figure 7 illustrating another form of the invention.

Figure 1:
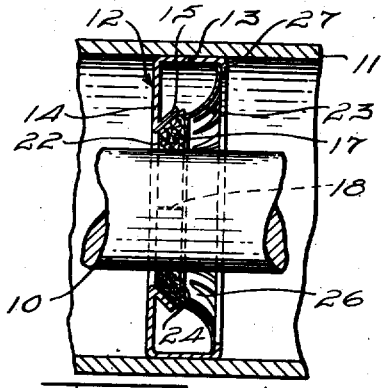
Figure 1 is a fragmentary cross-sectional view illustrating a rotary shaft and housing therefor, and a grease seal constructed according to one form of the invention, and located between the housing and the shaft.

Referring to Figure 1, a rotary shaft is indicated at 10 and a cylindrical housing or cage therefor is indicated at 11. Under certain operating conditions, it is desired to employ a seal in the housing 11 to prevent the escape of grease or other lubricant along the shaft 10 and according to one form of this invention, the seal comprises a shell 12 having an outer cylindrical wall 13, a radially disposed wall 14 at one end of the latter, and a reversely bent wall portion 15 of frusto-conical shape at the inner edge of the radial wall. It is to be observed that the junction of the walls 14 and 15 defines an opening 16 for receiving the shaft 10. The inner and conical surface of the wall 15 is adapted to support a sealing ring 17, formed of a suitably deformable material, transversely slit as indicated at 18, which has an inner cylindrical surface 19, an outer surface 20 of conical character adapted to engage the inner conical surface of the wall 15 on the shell 12, and a substantially radially disposed end surface 20 at the larger end of the ring. Figure 1 illustrates the manner in which the ring 17 seats on the frusto-conical wall 15, and it will be noted that a small annular space 22 is provided between the inner edge of the radial wall on the shell, and the shaft when the sealing ring is so positioned. This space under certain circumstances may permit proper manipulation of the sealing ring for maintaining a tight seal about the shaft.

Figure 2:
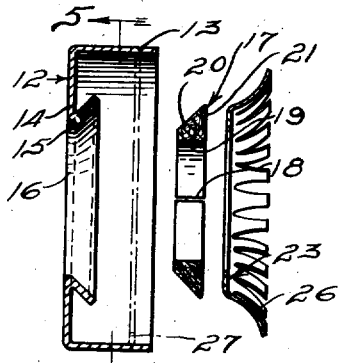
Figure 2 illustrates in cross section the several parts comprising the seal shown by Figure 1, prior to their assembly.
Figure 3:
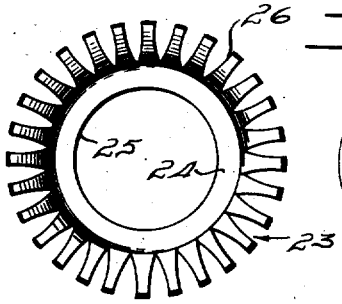
Figure 3 is an end view of the spring ring shown at the right in Figure 2.
Figure 4:
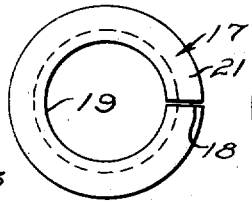
Figure 4 is an end view of the sealing ring shown centrally in Figure 2.
Figure 5:
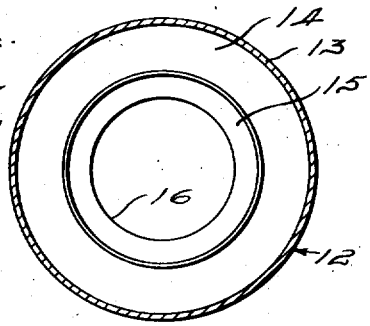
Figure 5 is a cross-sectional view taken substantially along the line 5—5 of Figure 2.

For maintaining the sealing ring against the wall 15 and shaft 10 and constantly applying pressure to the ring to insure a sealing engagement between the inner wall surface 19 of the ring and the shaft at all times, a spring ring 23 is provided, which has a radially disposed circular base portion 24 and an opening 25 substantially clearing the outer surface of the shaft 10. At the outer margin of the radial portion 24, prongs 26 extend outwardly entirely around the ring and, as best shown by Figure 2, such prongs are slightly arcuate in character. When the sealing ring and spring ring are associated with the shell 12 in the manner shown by Figure 1, the end portion of the shell opposite the radial wall 14 may be turned inwardly toward the center as indicated at 27 to provide an annular retaining flange for the outer ends of the prongs 26 on the spring ring. When the parts are so assembled, the concave faces of the prongs 26 face the radial wall 14 and this arrangement tends to provide radial ends on the prongs for engagement with the wall 27 as well as to maintain spring tension in the prongs. It will be noted that the circular portion 24 of the spring ring engages the radial end face 20 of the sealing ring and consequently the spring tension in the prongs is applied to the latter in a direction axially of the shaft 10.

From this description it should be apparent that the spring ring normally urges the sealing ring in an axial direction against the frusto-conical wall 15 and the latter, in turn, by virtue of its axial taper, guides the sealing ring and tends to contract it around the rotary shaft 10, thereby in turn causing the inner cylindrical surface 19 of the ring to constantly contact over a material distance with the outer surface of the shaft. At the same time, the pressure of the ring against the wall 15 prevents leakage of lubricant between these parts. Hence, the sealing ring is urged both axially and radially with respect to the shaft. Although the ring 17 may be formed endless out of sheet material as in conventional practice, it is preferred to use a transversely split sealing ring because a ring of this character may be manufactured from an elongated piece of sealing material such as leather, fabric or the like, which may be wound about a suitable former into helical shape and then the helix may be cut at appropriate points to form sealing rings of the character described and shown. By constructing the sealing ring in this manner it is apparent that waste material is avoided such as would occur if the rings were stamped from sheet material. Moreover a split ring lends itself more readily to movement and other manipulation necessary to maintain a constantly tight seal. Additionally the spring ring cooperating with the other parts, causes such contraction of the sealing ring, that the ends of the latter are always maintained forcefully in contact with each other, thereby preventing any possible escape of lubricant between the ends of the ring.

Figure 6:
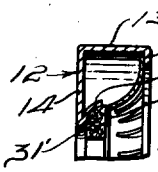
Figure 6 is a fragmentary cross-sectional view of a cage or shell for the sealing ring and spring, according to another form of the invention.

According to Figure 6, the shell 12 instead of having a true frusto-conical wall 15 as shown by Figure 1, has an axially inclined arcuate wall 30, preferably frusto-spherical in character, to provide a concave inner surface 31 for engagement with the sealing ring. When a shell of this character is employed, preferably the sealing ring, indicated at 31', instead of being provided with an outer conical surface 20 as indicated in Figure 2, will have an outer surface substantially complementary to the concave surface 31 on the shell. Such a construction allows the sealing ring to more readily adjust itself to insure a grease tight joint regardless of any slight misalignment of the shaft and cake. In other words, the sealing ring may turn about the center of curvature of the frusto-spherical surface to fully accommodate misalignment.

In the construction illustrated by Figure 7, the shell has a radial end wall 32 but instead of having a flange as shown by Figures 1, 2 and 6, a floating ring plate 33 is provided on the inner surface of the radial wall 32 and this plate has an intermediate recessed portion 34 adapted to receive a leather, fabric or the like ring 35 which in turn abuts the wall 32 of the shell. Inwardly of the ring 35, the plate 33 is reversely bent as indicated at 36 to provide a frusto-conical wall adapted to engage a sealing ring substantially identical to that shown by Figure 2. The spring ring for retaining the sealing ring against the frusto-conical wall 36 of the plate 33 may be substantially identical to that already described. The ring 35 manifestly prevents the escape of lubricant into the shell between the plate 33 and the radial wall 32. A seal of this character, that is of the floating type, is particularly advantageous in vehicles, where seals are employed on the front wheel spindles and in the rear axle housing.

This floating plate type of seal is especially advantageous where the shaft and its housing are slightly out of true concentricity in the plane of the seal, as may occur in an automobile axle or spindle due to an accident, as in such case the plate will move bodily with the shaft relative to the shell without subjecting the inner ring to undue radial distortion as might occur in the constructions illustrated in Figs. 1 to 6 inclusive where the sealing ring and shell are relatively fixed with respect to each other. In any construction where there is a possibility of lateral movement of a shaft in the housing therefor, the floating type of seal is particularly efficient.

Figure 8:
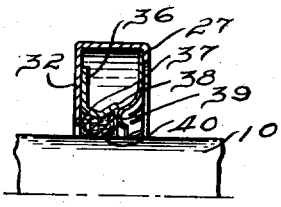
Figure 8 is a view similar to that shown by Figure 7, but illustrating still another form of the invention.

According to the construction shown by Fig. 8, a shell similar to that provided in Fig. 7 is provided, and a "floating" ring plate 36 engages the inner surface of the radial wall 32 on the shell. This plate terminates inwardly in a frusto-conical portion 37 directed toward the shaft, and then in a reversely directed frusto-conical portion 38 directed away from the shaft. A sealing ring 40 employed in this construction fits against both of the frusto-conical wall portions of the plate 36. The spring ring may have a convex base or plate portion 39 engaging the larger end face of the sealing ring, and this results in the spring tending to contract the larger end of the sealing ring into engagement with the shaft. Also in this connection it is desired to call attention to the fact that the sealing ring has a smaller end wall adapted to engage the inner marginal portion of the radial wall 32 of the shell. Hence, the spring ring not only maintains the sealing ring against the shaft, but also against both tapered walls of the plate 36 and the radial wall 32 of the shell.

In the construction shown by Figure 9, a similar arrangement to that shown by Figure 8 is provided with the exception that the sealing ring 40 has its end surface opposite the shell flange 32, engaged by an annular V shaped bead 43 on the spring ring 23. This V-portion may project into a recess in the end face of the sealing ring or it may merely have surface engagement therewith, but in either event the bead tends to press into the end face of the sealing ring and to force an inner lip portion indicated at 44, of the sealing ring against the shaft as well as to press the sealing ring against the frusto-conical wall 38 of the plate 36. From this it is apparent that the spring ring not only tends to move the sealing ring bodily in an axial direction and also in a radial direction by reason of its movement over the frusto-conical wall 38 of the plate 36, but also the ring tends to flare out the lip portion 44 of the sealing ring directly into contact with the shaft. This arrangement and manner of operation more positively insures a grease tight seal against the shaft which is constantly maintained.

In all of the constructions illustrated and described a tight seal on the shaft is provided which is constantly maintained by reason of the fact that the sealing ring is moved axially over a frusto-conical surface or similar surface which tends to contract the ring radially. Also a sealing ring constructed as described from an elongated piece of sealing material such as leather or other suitable material may be manufactured inexpensively and efficiently by first winding it into helical formation and then cutting the helix at predetermined points to form individual sealing rings. This method of manufacturing the rings avoids waste such as would occur if the rings were stamped from sheet material. Additionally, the transverse slit in the sealing ring under certain circumstances facilitates the proper manipulation of the ring to obtain a tight seal against the shaft. Seals of the character described and illustrated have proven very efficient in operation for the purpose of preventing the escape of lubricant or grease along the shaft and past the sealing ring.

Although more than one form of the invention has been illustrated and described, it will be apparent to those skilled in the art that various modifications may be made without departing from the scope of the appended claims.

I claim:

1. A grease seal comprising a shell having an apertured end wall, a shaft passing through said aperture, an annular radially floating plate member within the shell, sealing means between the plate member and end wall of the shell, said plate member having an axially inclined wall surface, a sealing ring engaging such wall surface, and resilient means for wedging the sealing ring between the inclined surface and shaft.

2. A grease seal comprising a shell having an apertured end wall, a shaft passing through the aperture, an annular wall operatively connected to the end wall of the shell, and having oppositely directed, axially inclined surfaces, a sealing ring between such surfaces and the shaft, and resilient means pressing against one end of the sealing ring.

3. The combination with a tubular housing, an annular shell having a substantally cylindrical portion disposed in the housing in close fitting relation thereto, a substantially radial flange projecting inwardly from one end of the cylindrical portion and terminating in a central opening, a shaft projecting through said opening, an annular member at the radially inner edge of the flange and abutting the inner end face of the latter, said member having a portion inclined axially outward, a sealing ring engaging the shaft and having an inclined surface engaging the inclined portion of the annular member, an annular element engaging the larger end face of the sealing ring, an inwardly directed flange on the opposite end of the cylindrical housing portion, and spring lips disposed circumferentially around the shaft and operatively connected to the element and abutting the last mentioned flange, for applying axial pressure against the larger end face of the sealing ring.

4. The combination with a tubular housing, an annular shell having a substantially cylindrical portion disposed in the housing in close fitting relation thereto, a substantially radial flange projecting inwardly from one end of the cylindrical portion and terminating in a central opening, a shaft projecting through said opening, an annular member at the radially inner edge of the flange and abutting the inner end face of the latter, said member having a portion inclined axially outward, a sealing ring engaging the shaft and having an inclined surface engaging the inclined portion of the annular member, an annular element engaging the larger end face of the sealing ring, and inwardly directed flange on the opposite end of the cylindrical housing wall, and spring lips disposed circumferentially around the shaft and operatively connected to the element and abutting the last mentioned flange, for applying axial pressure against the larger end face of the sealing ring, said annular member engaging the end face of the sealing ring, having an annular bead portion engaging such end face intermediate its radially inner and outer edges, which is adapted to bite into the sealing ring face between the shaft and inclined wall so as to normally tend to expand the sealing ring in a radial plane.

5. The combination with a tubular housing, an annular shell having a cylindrical portion disposed in closely fitting relation with the inner surface of the housing, a substantially radial flange projecting inwardly from one end of the cylindrical portion and terminating in a central opening, a shaft projecting through such opening, an annular member within the shell having a portion engaging the inner face of the shell flange, and an axially inclined portion, a sealing ring extending around the shaft, engaging the latter and having an inclined outer surface engaging the inclined portion of the annular member, spring means engaging the larger end face of the sealing ring for urging it axially of the shaft and along the inclined surface of the annular member, and means on the shell for anchoring the spring means, said spring means comprising an annular element engaging the end face of the sealing ring, and having spring lips projecting therefrom and engaging at their free ends with the anchoring means on the shell.

6. The combination with a tubular housing, an annular shell having a cylindrical portion disposed in closely fitting relation with the inner surface of the housing, a substantially radial flange projecting inwardly from one end of the cylindrical portion and terminating in a central opening, a shaft projecting through such opening, an annular member within the shell having a portion engaging the inner face of the shell flange, and an axially inclined portion, a sealing ring extending around the shaft, engaging the latter and having an inclined outer surface engaging the inclined portion of the annular member, spring means engaging the larger end face of the sealing ring for urging it axially of the shaft and along the inclined surface of the annular member, and means on the shell for anchoring the spring means, said spring means comprising an annular element engaging the end face of the sealing ring, and having spring lips projecting therefrom and engaging at their free ends with the anchoring means on the shell, said opening in the shell flange being larger than the shaft and the annular member and sealing ring being floatable in a radial plane within the shell so that the sealing means is effective even though the shaft floats radially with respect to the shell.

7. The combination with a tubular housing, of a shell within the housing and having an annular cylindrical wall closely fitting the inner surface of the housing, a substantially radial flange projecting inwardly from one end of the cylindrical portion, an annular member within the shell abutting said flange, and having an axially inclined portion, a sealing ring extending axially past the annular member within the latter and engaging the shell flange, and having an inclined surface engaging the inclined portion of the annular member and spring means for constantly urging the sealing ring along such inclined surface and into engagement with the shell flange.

8. The combination with a tubular housing, of a shell having an annular cylindrical portion disposed within the housing in closely fitting relation thereto, a substantially radial flange projecting inwardly from one end of the cylindrical portion, a sealing ring engaging the flange, a shaft extending through an opening in the central part of the flange, said sealing ring also engaging the shaft, and having an axially inclined surface, an annular member around the shaft and floatable radially in the shell and having an inclined portion engaging the inclined surface on the sealing ring, spring means for pressing the annular member and sealing ring together along the inclined contact, and the sealing ring against the shell flange, and means on the shell for anchoring the spring means.

9. The combination with a tubular housing, of a shell having an annular cylindrical portion disposed within the housing in closely fitting relation thereto, a substantially radial flange projecting inwardly from one end of the cylindrical portion, a shaft extending through an enlarged opening in the central part of the flange so as to be able to move radially in said opening, an annular sealing ring encircling the shaft and engaging such radial flange, said sealing ring having an axially inclined outer surface, an annular ring encircling the shaft and floatable radially in the shell and having an inclined portion engaging the inclined surface of the sealing ring, and resilient means within the shell for urging the sealing ring and annular ring together, and the sealing ring against the radial flange, the parts being so arranged that during any radial movement of the shaft with respect to the shell, the annular member and sealing ring float radially therewith while maintaining an effective seal between the shaft and such radial flange.

10. A seal for insertion as a unit within a tubular housing about a shaft in the housing, comprising a thin one-piece sheet metal stamping of uniform thickness throughout, said stamping being characterized by an outer wall for sealed engagement with the inner surface of the housing, an integral inwardly directed wall at one end of the outer wall provided with an opening of considerably larger diameter than the shaft, an integral reentrant portion extending from the opening in said wall at an abrupt angle to the end wall back into the stamping in substantially spaced relation to the shaft, and an integral inwardly directed flange at the other end of the outer wall of the stamping, a packing ring of flexible material within said one-piece stamping having substantially spaced inner and outer sealing portions and arranged with the outer portion only of the ring in engagement with the reentrant portion of the first mentioned end wall, and an annular one-piece spring also within the stamping positioned in direct engagement with both the packing ring and the flange on the stamping, for causing constriction of the inner portion of the ring against the shaft.

JOHN R. WINTER.